T. A. EDISON.
TUBE FILLING AND TAMPING MACHINE.
APPLICATION FILED OCT. 14, 1905.

936,433.

Patented Oct. 12, 1909.
6 SHEETS—SHEET 1.

*Fig. 1.*

Attest:
Edgworth Greene
Delos Holden

Inventor:
Thomas A. Edison
by Frank L. Dyer Atty.

T. A. EDISON.
TUBE FILLING AND TAMPING MACHINE.
APPLICATION FILED OCT. 14, 1905.

936,433.

Patented Oct. 12, 1909.
6 SHEETS—SHEET 2.

Fig. 2.

Attest:
Edgworth Greene
Delos Holden

Inventor:
Thomas A. Edison
by Frank L. Dyer Atty.

T. A. EDISON.
TUBE FILLING AND TAMPING MACHINE.
APPLICATION FILED OCT. 14, 1905.

936,433.

Patented Oct. 12, 1909.
6 SHEETS—SHEET 4.

Attest:

Inventor:
Thomas A. Edison
by Frank L. Dyer Atty.

T. A. EDISON.
TUBE FILLING AND TAMPING MACHINE.
APPLICATION FILED OCT. 14, 1905.

936,433.

Patented Oct. 12, 1909.
6 SHEETS—SHEET 6.

Attest:
Edgeworth Greene
Delos Holden

Inventor:
Thomas A. Edison
by Frank L. Dyer Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

TUBE FILLING AND TAMPING MACHINE.

936,433.    Specification of Letters Patent.    Patented Oct. 12, 1909.

Application filed October 14, 1905. Serial No. 282,692.

*To all whom it may concern:*

Be it known that I, THOMAS A. EDISON, a citizen of the United States, residing at Llewellyn Park, Orange, county of Essex, and State of New Jersey, have invented certain new and useful Improvements in Tube Filling and Tamping Machines, of which the following is a description.

My invention relates to an improved machine or apparatus which has been designed particularly for the purpose of automatically filling and tamping active material into small perforated tubes, the ends of which are adapted to be subsequently closed, after which a number of such tubes will be mounted in a suitable grid to constitute a storage battery electrode, as described in an application filed by Thomas A. Edison and Jonas W. Aylsworth, April 28th, 1905, Serial No. 257,807. It will be understood of course, that the invention may be used for other purposes.

The object of my invention is to provide an automatic machine by which carefully regulated and relatively minute amounts of active material will be supplied to a number of tubes, a uniform tamping pressure being applied to each increment of active material so introduced, and provision being made for automatically arresting the operation of the machine when a predetermined number of increments of active materials have been introduced and tamped within the tubes, whereby the tubes filled with active material will be practically uniform as to the weight of active material carried, and as to the density and molecular condition of such active material, so that the resulting electrode may be all made of a standard capacity.

I find it highly important that in the manufacture of storage battery electrodes of the type disclosed in said application, the several tubes should contain the active material in such a tightly compressed condition, that relative movement of the conducting flakes with which the active material is mixed, shall be prevented, because otherwise contact between the conducting flakes and the active material will be seriously affected. Consequently, in order that the tendency of the active material to swell by absorption of the electrolyte and by electrolytic oxidation may not result in a shifting of the contents of the several tubes, it is important that each minute increment of active material shall be subjected to a pressure of about one thousand pounds, in order that the mass may be closely compacted. The operations referred to are preferably performed only in connection with a depolarizing electrode, where the active material consists of nickel hydroxid, with which flakes of cobalt-nickel alloy are added, since in practice difficulties arising from bad contact have been only experienced on this pole. In the case of the iron mass, where the active material is admixed with mercury, contact difficulties have not been experienced, and consequently, the negative electrodes may very conveniently be made as heretofore, and as disclosed for example, in my Patents Nos. 704,305 and 704,306, dated July 8th, 1902, and other patents relating to my improved storage battery.

In order that the invention may be better understood, attention is directed to the accompanying drawings, forming part of this specification, and in which—

Fig. 5, a section on the line 5—5 of Fig. 4; Fig. 15, a section on the line 15—15 of Fig. 13; and, Fig. 16, a section through two of the pockets or tubes, showing the same partly filled with active material.

In all the above views, corresponding parts are represented by the same numerals of reference.

Figure 1:
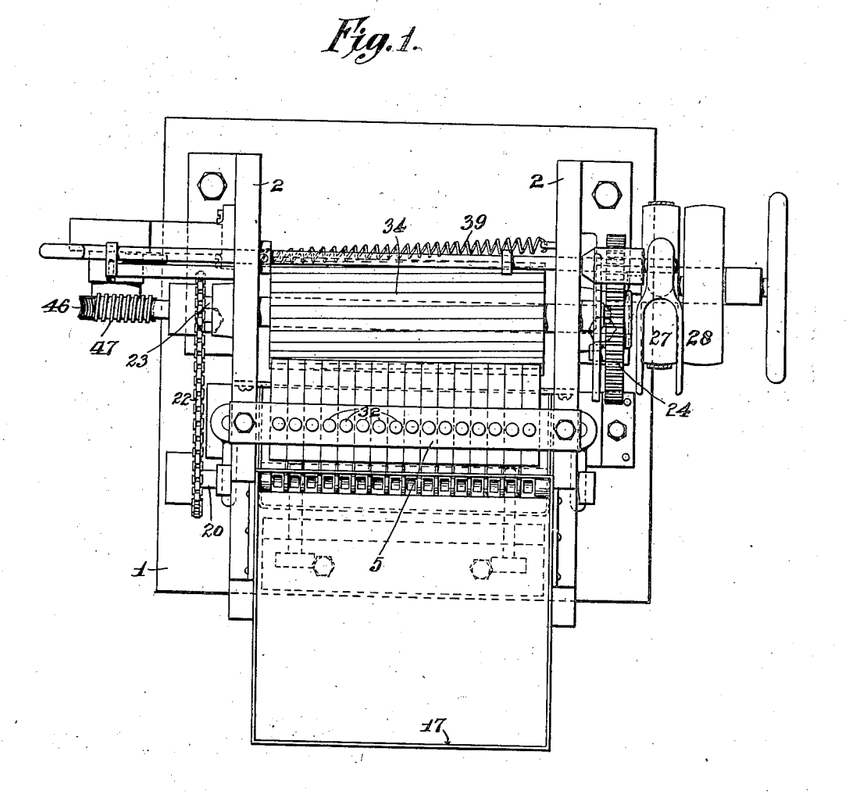
Figure 1, is a plan view of the complete machine.
Figure 2:
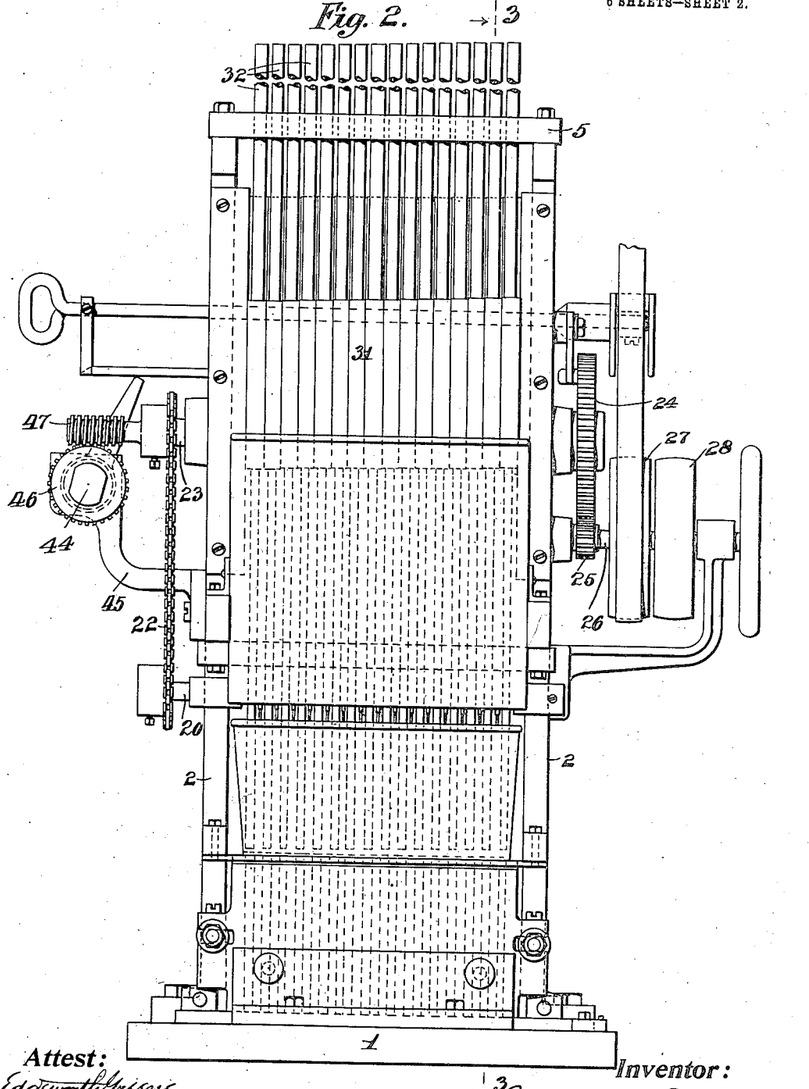
Fig. 2, a front elevation of the same.
Figure 3:
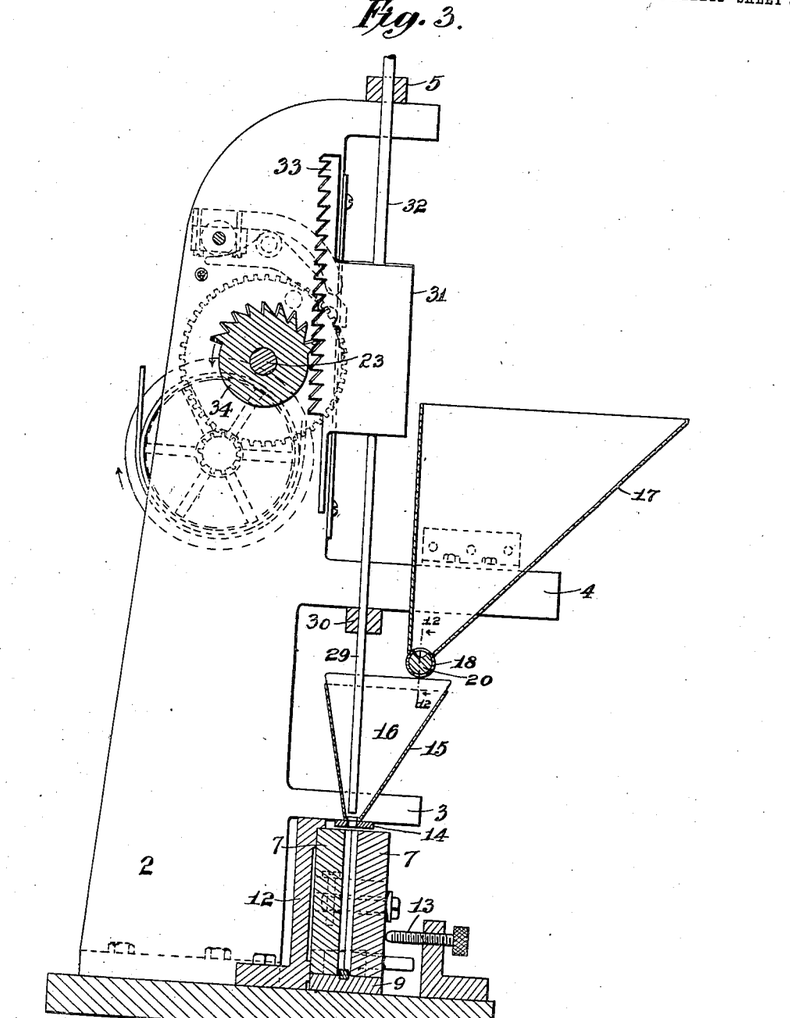
Fig. 3, a section on the line 3—3 of Fig. 2.
Figures 4, 7, 8, 9:
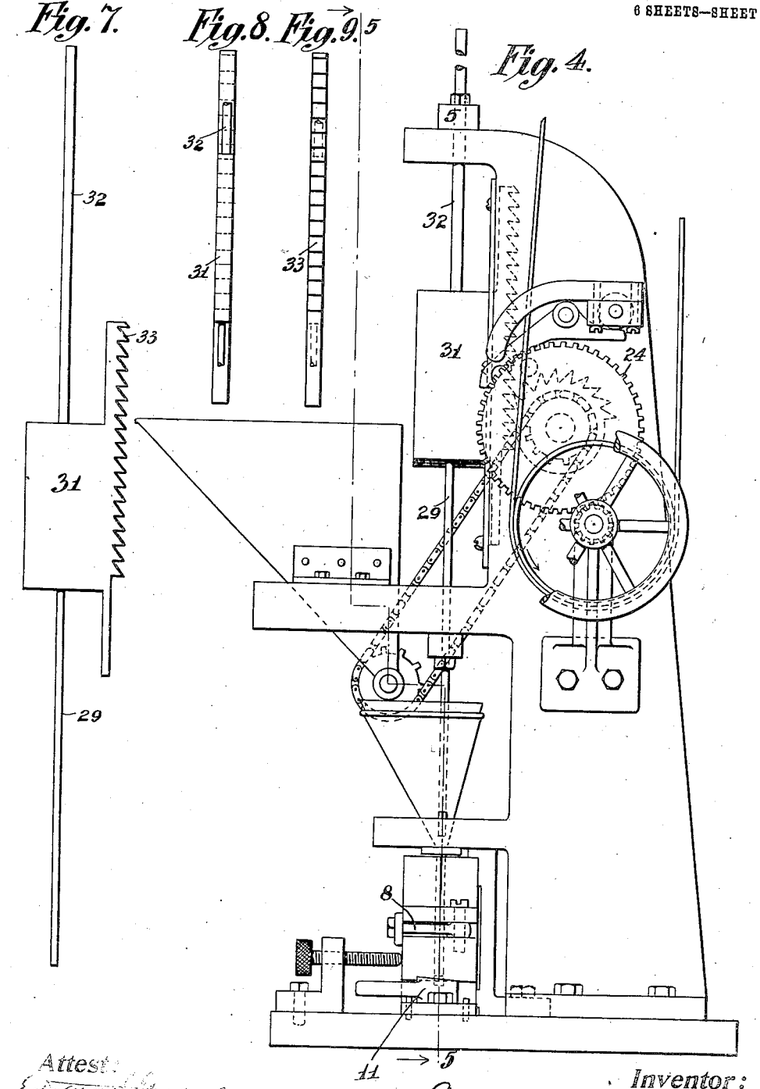
Fig. 4, a side view.
Fig. 7, a separate side elevation of one of the tamping plungers.
Fig. 8, a front view of the same, partly broken away.
Fig. 9, a rear view, corresponding to Fig. 8.
Figures 5, 16:
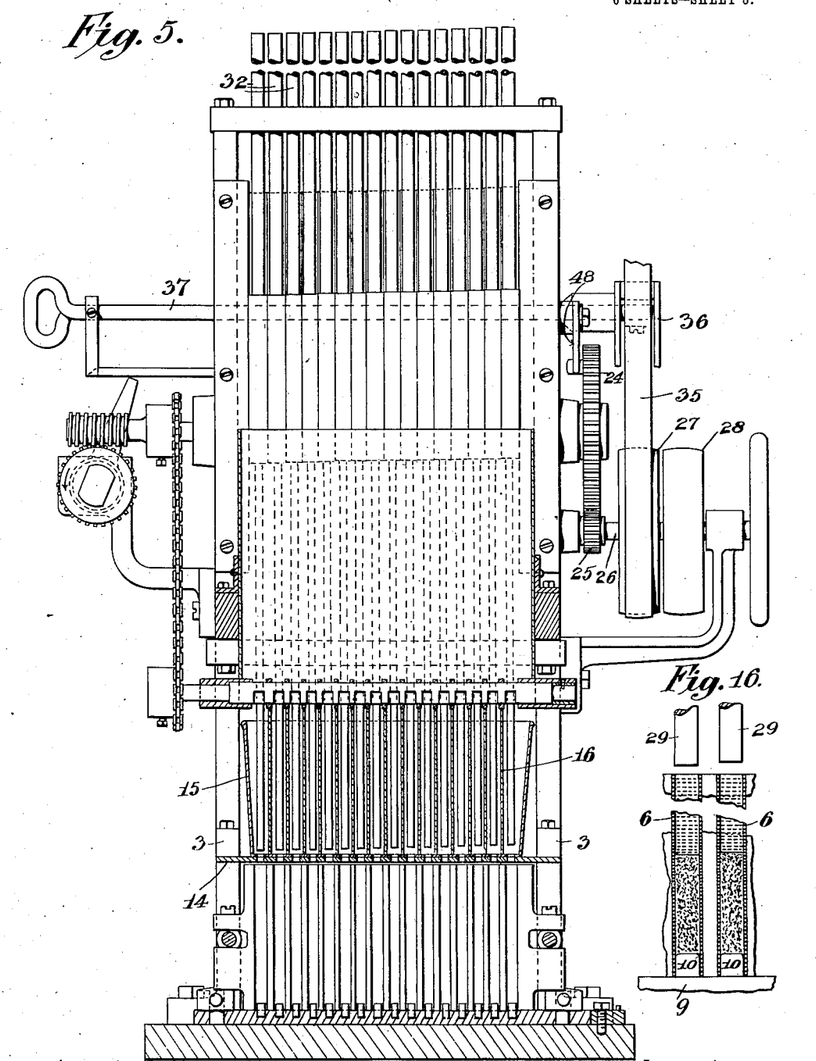

The frame of the machine comprises a base 1, sides 2—2, having integral supporting arms 3—3 and 4—4, and a top plate 5 connecting the sides 2—2 at their upper end. The tubes or pockets 6 (see Fig. 16) are formed of thin perforated sheet iron or steel, preferably, carefully electro-plated with an alloy of nickel and cobalt, and subsequently subjected to a welding temperature in a hydrogen atmosphere, so as to remove any condition of tension in the electro-deposited film, and also to superficially weld the metal at the seam to strengthen the latter. In practice, these tubes are about 4 inches in length, and one-quarter of an inch in internal diameter. A number of these tubes are clamped tightly between holding plates 7—7 and locked together by a holding bolt 8 at each side, and seated upon a suitable bed-plate 9, carrying studs 10, which fit snugly within the lower ends of the tubes 6, so as to present a clearance space at the bottom of each tube to permit the metal to be compressed, for the purpose of sealing the tubes. At the upper end a similar clearance space is provided by arresting the feed of material before the tubes become entirely filled, as will be obvious. The bed-plate 9 is provided at each side with a pivoted cam 11, (Figs. 4 and 5) which may be operated to separate the bed-plate 9 from the clamping plates 7—7, after the tubes have been filled. The clamping plates and bed-plate having been thus assembled with the number of tubes in position between the clamping plates, are held firmly against a support 12 by means of a screw 13. In this position the holes formed between the clamping plates 7—7 and corresponding to the several tubes, will be located immediately below a guide 14, carried by the arm 3, through which the plungers pass.

Supported by the guide 14 is a hopper 15, having a number of partitions 16 therein, dividing the hopper into a plurality of sections corresponding to the number of tubes to be filled. The hopper 15 is merely an auxiliary device for receiving the successive increments of active material to be introduced within the pockets or tubes and acts merely as a guide for directing these increments delivered by the main hopper 17 into the several tubes. The main hopper containing the supply of active material is carried by the arms 4—4, and its bottom consists of a sleeve 18 having top and bottom openings 19 therein, corresponding to the several sections of the auxiliary hopper 15. Rotatably mounted in this sleeve 18, is a feeding shaft 20, provided with a corresponding series of pockets 21 for receiving the increments of active material at the upper openings 19 and discharging them into the lower openings into the auxiliary hopper, as will be understood. The shaft 20 is driven by a sprocket chain 22 from a countershaft 23, operated by gearing 24 and 25 from a main shaft 26, the latter having a fast pulley 27 and a loose pulley 28 thereon. The plungers 29, corresponding one to each tube or pocket are movable vertically and are so arranged as to give a uniform tamping pressure on each increment irrespective of the amount of material at any time within the tubes. The mechanism for operating the plungers should, therefore, be of such a character as to permit the plungers to always drop from a fixed and definite height above the increments to be tamped. This is effected by the mechanism shown. The plungers 29 are mounted in guides 30 and are provided with weights 31, from which extend guide rods 32, working in the top plate 5. Each of the weights is formed with an integral ratchet toothed rack 33 thereon, with which engages the ratchet teeth on a cylinder 34 mounted on the shaft 23. The racks 33 are sufficiently extended to be engaged by the teeth on the cylinder 34 at any position which may be occupied by the plunger within the tubes to be filled, so that each plunger will be elevated for a distance corresponding to the fixed number of teeth on the cylinder 34, and therefore be allowed to drop when the teeth separate, always from the same height above the active material within the tube so as to apply to the same a constant tamping pressure. The teeth which form the rack 33 are so located that when the plunger 29 is in its lowest possible position, the upper part of the rack 33 will be in position to be engaged by the teeth on the cylinder 34, and as the plunger 29 in performing its tamping operations occupies positions which are more and more elevated, the teeth of the cylinder 34 will eventually engage the teeth which form the lower part of the rack 33, the number of teeth in the rack being substantially greater than the number of teeth on the cylinder.

Figures 6, 10, 11:
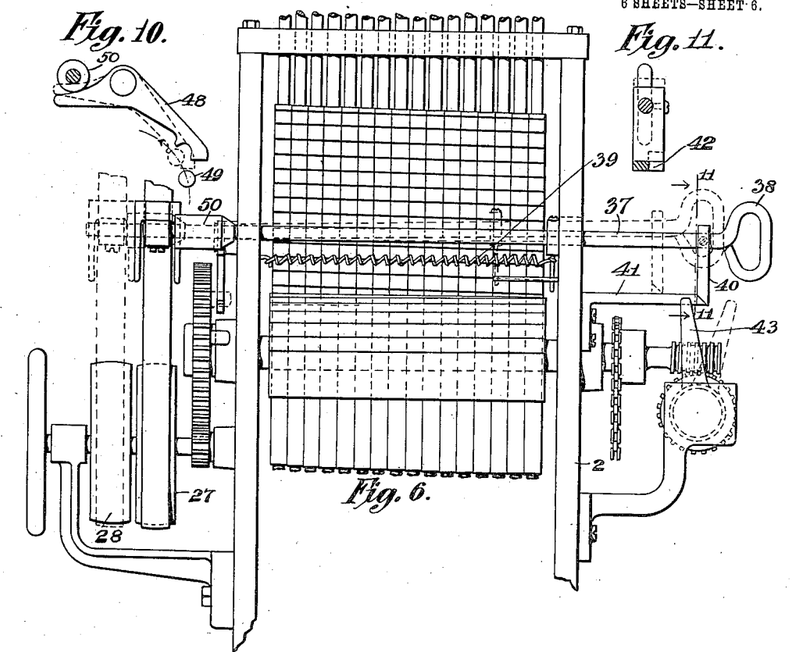
Fig. 6, an elevation of a part of the machine, showing particularly the automatic trip mechanism for arresting the operation when the desired number of increments of active material has been introduced within the tubes.
Fig. 10, a detached view of the stopping pawl.
Fig. 11, a section on the line 11—11 of Fig. 6.
Figure 12:
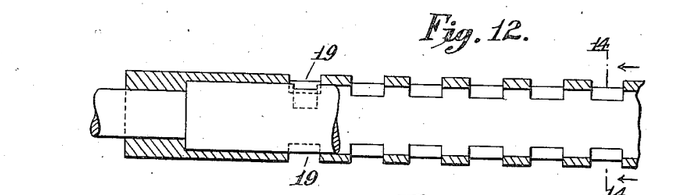
Fig. 12, a section on line 12—12 of Fig. 3, on an enlarged scale, illustrating the feeding shaft and sleeve.
Figure 13:
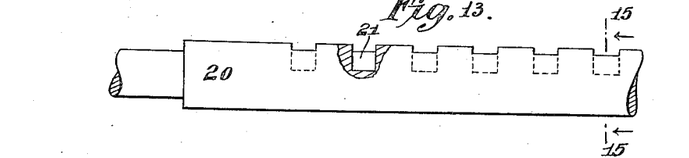
Fig. 13, a side elevation, partly in section on the same scale as Fig. 12, of the feeding shaft.
Figure 14:
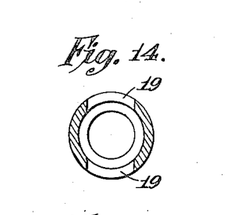
Fig. 14, a section on the line 14—14 of Fig. 12.
Figure 15:
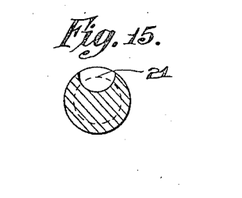

The driving belt 35 normally engages the fast pulley 27. Coöperating with the belt 35 is a belt shifter 36 carried on the end of a longitudinally movable rod 37 provided with a handle 38 and adapted to be stressed by a spring 39 so as to shift the belt to the loose pulley when released. The rod 37 is normally locked in position to maintain the belt 35 on the fast pulley 27 by means of a finger 40 engaging the horizontal bracket 41 secured to one of the sides 2—2 of the machine. This finger is also provided with an inclined surface 42 (Fig. 11) with which a tripper 43 is adapted to engage, so as to elevate the finger and release it from the bracket 41 permitting the spring 39 to move the rod 37 and shift the belt to the loose pulley, thereby stopping the machine. The tripper 43 is carried on a shaft 44, mounted in a bracket 45 and provided with a worm gear 46 with which a worm 47 on the shaft 23 engages. Consequently as the machine operates the tripper will slowly make a complete rotation and at the completion thereof, will elevate the finger 40 as explained, to arrest the operation of the machine, the parts being so proportioned that this result takes place when exactly the right amount of active material has been introduced within the pockets or tubes. In order to prevent overthrow, resulting in possible irregularity in the number of increments supplied to each pocket or tube, I provide an arresting pawl 48, adapted to be thrown down upon, and engage a pin 49, carried on the gear 24 when the belt is shifted. The tail of this arresting pawl is normally depressed so as to keep the pawl out of the path of the pin 49 by a cam 50 on the rod 37. Consequently, when the rod 37 is shifted, as explained, the arresting pawl will be dropped into the path of the pin 49 and the machine will be brought to rest before the gear 24 can make more than one complete rotation. Also, when the arresting pawl engages the pin 49, the several plungers will be locked in an elevated position to permit the filled tubes to be removed. Preferably, the teeth on the cylinder 34 are disposed at a slight angle to the longitudinal axis thereof (see Fig. 6) so that the weights 31 of the several plungers will be picked up by these teeth successively and the plungers when released will also fall in rapid succession, instead of simultaneously. This provides for a somewhat smoother operation in practice and more uniformly distributes the work to be developed and the strains encountered.

The operation of the machine has already been generally indicated by the preceding description and may be briefly summarized. A sufficient number of empty pockets or tubes is first placed within the clamping plate 7 and lock firmly in position by a screw 13. Active material is supplied to the hopper 17 and is kept distributed therein as uniformly as possible. Power being applied to the shaft 26, the shaft 23 will be rotated and drives the feed shaft 20, resulting in successive increments of active material being removed from the main hopper by the several pockets 21 and deposited in the sections of the auxiliary hopper, falling therefrom under the lower ends of the plungers into the several tubes. At the same time, the teeth on the cylinder 34 will successively engage the several racks 33 of the plungers, elevating all of the plungers until the last teeth on the cylinder 34 leaves the racks successively, permitting the plungers to drop in rapid succession into the tubes to tamp the increments introduced therein, as explained. Preferably, the mechanism is so designed that the plungers will be elevated and dropped twice upon each increment, but obviously the feeding mechanism may be so operated, in its relation to the tamping mechanism that the plungers may be elevated and dropped only once, or if desired, more than twice for each increment. When the proper amount of active material has been thus introduced within each tube, the tripper 43 comes beneath the finger 40 to release the same, thereby shifting the plate on to the loose pulley. At the same time the arresting pawl will be released to fall into the path of the pin 49, so as to prevent the spur gear 24 from making more than a complete rotation before the machine is stopped. The screw 13 is now released, permitting the blocks 7—7 and base 9 to be removed, after which the cams 11 are operated to separate the blocks 7 from the bed plate 9, and finally, the tie bolts 8 are released to engage the two blocks and permit the filled tubes to be removed.

Having now described my invention, what I claim as new therein and desire to secure by Letters Patent is:

1. In a tube filling and tamping machine, the combination with a tube support, means for feeding successive increments of material to the same, of a plunger coöperating therewith for automatically applying a tamping pressure to each increment introduced within the tube, means for arresting the feeding and tamping operations, and means for automatically operating said arresting means at the end of a given number of tamping operations, substantially as set forth.

2. In a tube filling and tamping machine, the combination of a support for a plurality of tubes arranged vertically and side by side, of mechanism for introducing successive increments of material simultaneously to the several tubes, a series of plungers corresponding to said tubes, means coöperating with the feeding mechanism for applying a tamping pressure to each increment after its introduction within the tubes, means for arresting the feeding and tamping operations, and means for automatically operating said arresting means at the end of a given number of tamping operations, substantially as set forth.

3. In a tube filling and tamping mechanism, the combination of a holder for supporting the tube against disrupting pressure, said holder comprising an elevation adapted to enter the lower end of said tube to prevent the filling thereof, mechanism for introducing increments of material successively into said tube, and a plunger adapted to enter said tube for imposing a tamping pressure upon each increment, substantially as set forth.

4. A support for sustaining a plurality of tubes in a tube-filling and tamping machine, comprising two clamping members, means for removably locking the same together, a separate base and cam mechanism for moving the clamping members relatively to said base, substantially as set forth.

5. In tube-filling and tamping mechanism, the combination with mechanism for vertically sustaining the tube and mechanism for feeding successive increments of material thereto, of a gravity plunger movable into and out of the tube, a rack carried by the plunger and a partially toothed drum for elevating the plunger to the same predetermined extent above the level of the material in the tube each time the plunger is so raised, and then releasing the plunger to permit the same to drop and deliver tamping blows to the increments of material, the number of teeth on the rack being considerably greater than on the drum, whereby the plunger may be caused to fall a uniform distance on the surface of the material in the tube each reciprocation of the plunger, regardless of the level of the material in the tube, throughout a wide range of positions of the plunger, substantially as set forth.

6. In tube-filling and tamping mechanism, comprising the combination with means for sustaining a series of tubes vertically side by side, and mechanism for feeding successive increments of material to said tubes, of a series of plungers coöperating with the tubes, a rack on each plunger and a partially toothed drum for engaging the racks of the several plungers for elevating the same to the same predetermined distance above the level of the material within the tubes each time the plungers are so raised, and for releasing the plungers whereby the latter will fall and deliver tamping blows to the increments of material delivered to the tubes, the number of teeth on the racks being considerably greater than the teeth co-acting therewith on the drum, whereby the plungers may be caused to fall a uniform distance on the surface of the material in the tubes each reciprocation of the plungers, regardless of the level of the material in the tubes, throughout a wide range of positions of the plungers, substantially as set forth.

7. In tube-filling and tamping mechanism, the combination with means for sustaining a series of tubes in a vertical position side by side, and mechanism for feeding increments of material to said tubes, of a series of tamping plungers coöperating with the tubes, a rack on each plunger and a drum having a series of teeth extending only part way around the periphery of the drum coöperating with each rack, the corresponding teeth of the different series being disposed in a line inclined somewhat to the longitudinal axis of the drum, the said drum engaging the racks of the several plungers for elevating the same successively to the same predetermined distances above the level of the material within the tubes each time the plungers are so raised, and successively releasing and permitting the plungers to drop by gravity to impart tamping blows to the increments of material delivered to said tubes, the teeth on the racks being of a considerably greater number than the co-acting teeth on the drum, substantially as set forth.

8. In tube-filling and tamping mechanism, the combination with means for sustaining a tube in a vertical position and a tamping plunger arranged to be elevated and dropped by gravity within said tube, of a hopper containing material to be supplied to said tube, an apertured sleeve constituting the bottom of said hopper, and a shaft within said sleeve and formed with a pocket therein for selecting and delivering to the tube increments of material, substantially as and for the purposes set forth.

9. In tube-filling and tamping mechanism, the combination with means for supporting vertically, side by side, a plurality of tubes, a series of tamping plungers coöperating with said tubes for delivering tamping blows to the material delivered to the same, of a hopper containing material to be supplied to said tube and an apertured sleeve forming the bottom of said hopper, and a shaft within said sleeve and provided with a series of pockets for selecting increments of material and delivering the same to the several tubes, substantially as set forth.

10. In tube-filling and tamping mechanism, the combination with means for sustaining a plurality of tubes side by side in a vertical position, a series of tamping plungers coöperating with said tube, mechanism for elevating and releasing said plungers, and means for arresting the operation of such mechanism when a predetermined number of increments of material have been introduced within the tubes, substantially as and for the purposes set forth.

11. In tube-filling and tamping mechanism, the combination with means for sustaining a plurality of tubes in a vertical position side by side, means for feeding successive increments of material to said tubes, a series of plungers coöperating with the tubes for tamping the increments of material delivered to the same, mechanism for operating said plungers, a drum operated from said mechanism and a tripping device actuated by said drum for arresting said mechanism when the drum has made a predetermined number of rotations, substantially as set forth.

12. In tube-filling and tamping mechanism, the combination with means for sustaining a plurality of tubes in a vertical position side by side, means for feeding successive increments of material to the said tubes, a series of plungers coöperating with the tubes for tamping the increments of material delivered to the same, mechanism for operating said plungers, a drum operated from said mechanism, a tripping device actuated by said drum for arresting said mechanism when the drum has made a predetermined number of rotations, and an arresting pawl for engaging a part of said mechanism, substantially as set forth.

13. In tube-filling and tamping mechanism, the combination with means for sustaining a plurality of tubes in a vertical position side by side, means for feeding successive increments of material to the said tubes, a series of plungers coöperating with the tubes for tamping the increments of material delivered to the same, mechanism for operating said plungers, a drum operated from said mechanism, a tripping device actuated by said drum for arresting said mechanism when the drum has made a predetermined number of rotations, a normally elevated arresting pawl, and means for releasing said arresting pawl when said tripping mechanism operates, substantially as and for the purposes set forth.

14. In a tube filling machine, the combination of a tube support, a feed device for supplying successive increments of material to the tube, means for operating said feed device, means for arresting said feed device, and means driven by said operating means for operating the arresting means as soon as a given number of increments have been supplied, substantially as set forth.

15. In a tube filling machine, the combination of a tube support, a plunger adapted to enter the tube, means for operating said plunger, means for arresting said operating means, and means driven by said operating means for operating the arresting means at the end of a given number of movements of the plunger, substantially as set forth.

16. In a tube filling machine, the combination of a tube support, a feed device for supplying successive increments of material to the tube, means for driving said feed device, a tripper for disconnecting said driving means, and a lock operated simultaneously with the tripper to prevent movement due to momentum of the parts disconnected by the tripper, substantially as set forth.

17. In a tube filling machine, the combination of a tube support, a feed device for supplying successive increments of material to the tube, means for driving said feed device comprising a belt, a fixed and a loose pulley, means for automatically shifting said belt at the end of a predetermined number of revolutions of said fixed pulley, and a lock for said feed mechanism operating simultaneously with said belt shifting device to prevent motion due to momentum, substantially as set forth.

This specification signed and witnessed this 12th day of October, 1905.

THOS. A. EDISON.

Witnesses:
FRANK L. DYER,
MINA C. MACARTHUR.